United States Patent
Zhang et al.

(10) Patent No.: US 10,965,675 B2
(45) Date of Patent: Mar. 30, 2021

(54) PREVENTING UNAUTHORIZED ACCESS TO SECURE INFORMATION SYSTEMS USING ADVANCED PRE-AUTHENTICATION TECHNIQUES

(71) Applicant: Bank of America Corporation, Charlotte, NC (US)

(72) Inventors: Xianhong Zhang, Issaquah, WA (US); Kalyan V. Pasumarthi, Bothell, WA (US); Jeffrey Jacoby, Sammamish, WA (US); Hitesh Shah, Seattle, WA (US); Archie Agrawal, Seattle, WA (US); Michael E. Toth, Charlotte, NC (US); Yu Fu, Bothell, WA (US)

(73) Assignee: Bank of America Corporation, Charlotte, NC (US)

( * ) Notice: Subject to any disclaimer, the term of this patent is extended or adjusted under 35 U.S.C. 154(b) by 466 days.

(21) Appl. No.: 15/920,549

(22) Filed: Mar. 14, 2018

(65) Prior Publication Data
US 2019/0289007 A1 Sep. 19, 2019

(51) Int. Cl.
*H04L 29/06* (2006.01)

(52) U.S. Cl.
CPC .............. *H04L 63/10* (2013.01); *H04L 63/08* (2013.01); *H04L 63/1416* (2013.01); *H04L 63/1425* (2013.01); *H04L 63/1491* (2013.01)

(58) Field of Classification Search
CPC ..... H04L 63/1425; H04L 63/10; H04L 63/08; H04L 63/1491; G06F 21/552; G06F 21/10
USPC .......................................................... 726/6
See application file for complete search history.

(56) References Cited

U.S. PATENT DOCUMENTS

| | | | |
|---|---|---|---|
| 8,078,870 B2 | 12/2011 | Nanda et al. |
| 8,555,388 B1 | 10/2013 | Wang et al. |
| 9,237,167 B1 | 1/2016 | Manion et al. |
| 9,350,758 B1 | 5/2016 | Kharoni et al. |

(Continued)

OTHER PUBLICATIONS

Wikipedia, "List of HTTP header fields," last edited Jan. 10, 2018, retrieved Jan. 12, 2018 from https://en.wkipedia.org/wiki/List_of_HTTP_header fields, 9 pages.

*Primary Examiner* — Bryan F Wright
(74) *Attorney, Agent, or Firm* — Banner & Witcoff, Ltd.; Michael A. Springs

(57) ABSTRACT

Aspects of the disclosure relate to preventing unauthorized access to secured information systems using advanced pre-authentication techniques. A computing platform may receive, from a local traffic manager, a first enriched access request associated with a first remote computing device. Then, the computing platform may apply a pre-authentication classification model to the first enriched access request associated with the first remote computing device. Thereafter, the computing platform may determine that the first enriched access request associated with the first remote computing device is likely malicious. Then, the computing platform may generate one or more first pre-authentication response commands directing client portal server infrastructure to process the first enriched access request associated with the first remote computing device as a malicious request. Subsequently, the computing platform may send the one or more first pre-authentication response commands to the client portal server infrastructure.

16 Claims, 9 Drawing Sheets

(56) References Cited

U.S. PATENT DOCUMENTS

| | | | |
|---|---|---|---|
| 9,430,646 B1* | 8/2016 | Mushtaq | H04L 63/1425 |
| 9,729,565 B2 | 8/2017 | Reddy et al. | |
| 2011/0154488 A1* | 6/2011 | Rajan | H04L 63/123 726/22 |
| 2011/0185421 A1* | 7/2011 | Wittenstein | H04L 63/1416 726/22 |
| 2011/0289116 A1* | 11/2011 | Horadan | G06F 21/10 707/781 |
| 2012/0278886 A1* | 11/2012 | Luna | G06F 21/552 726/22 |
| 2016/0294858 A1* | 10/2016 | Woolward | H04L 63/20 |
| 2016/0328742 A1 | 11/2016 | Shiravi Khozani et al. | |
| 2016/0337333 A1* | 11/2016 | Rollet | H04L 63/083 |
| 2017/0293756 A1 | 10/2017 | Brown et al. | |
| 2018/0039494 A1 | 2/2018 | Lander et al. | |
| 2018/0039501 A1 | 2/2018 | Jain et al. | |
| 2018/0039512 A1 | 2/2018 | Almasan et al. | |
| 2018/0039667 A1 | 2/2018 | Pierce et al. | |
| 2018/0039973 A1 | 2/2018 | Bishop et al. | |
| 2018/0040064 A1 | 2/2018 | Grigg et al. | |
| 2018/0040068 A1 | 2/2018 | Noonan | |
| 2018/0041336 A1 | 2/2018 | Keshava et al. | |
| 2018/0041395 A1 | 2/2018 | Short et al. | |
| 2018/0041421 A1 | 2/2018 | Lapidous et al. | |
| 2018/0041467 A1 | 2/2018 | Vats et al. | |
| 2018/0041470 A1 | 2/2018 | Schultz et al. | |
| 2018/0041477 A1 | 2/2018 | Shaposhnik | |
| 2018/0041485 A1 | 2/2018 | O'Hare et al. | |
| 2018/0041487 A1 | 2/2018 | Wang | |
| 2018/0041491 A1 | 2/2018 | Gupta et al. | |
| 2018/0041515 A1 | 2/2018 | Gupta et al. | |
| 2018/0041516 A1 | 2/2018 | Vats et al. | |
| 2018/0041527 A1 | 2/2018 | Call et al. | |
| 2018/0041544 A1 | 2/2018 | Brookins et al. | |
| 2018/0041588 A1 | 2/2018 | Straub et al. | |
| 2018/0041589 A1 | 2/2018 | Bolger et al. | |
| 2018/0041598 A1 | 2/2018 | Vats et al. | |
| 2018/0041602 A1 | 2/2018 | Gorti et al. | |
| 2018/0041613 A1 | 2/2018 | Lapidous et al. | |
| 2018/0041631 A1 | 2/2018 | Douglas | |
| 2018/0041812 A1 | 2/2018 | Brown | |
| 2018/0042058 A1 | 2/2018 | McCann et al. | |
| 2018/0043901 A1 | 2/2018 | Kim et al. | |
| 2018/0046552 A1 | 2/2018 | Madhavarapu et al. | |
| 2018/0046623 A1 | 2/2018 | Faith et al. | |
| 2018/0046923 A1 | 2/2018 | Jerram et al. | |
| 2018/0046947 A1 | 2/2018 | Clayton et al. | |
| 2018/0047063 A1 | 2/2018 | Tuchman et al. | |
| 2018/0047072 A1 | 2/2018 | Chow | |
| 2018/0047105 A1 | 2/2018 | Quinton | |
| 2018/0047113 A1 | 2/2018 | Chelst et al. | |
| 2018/0048514 A1 | 2/2018 | Arunachalam et al. | |
| 2018/0048549 A1 | 2/2018 | Edwards et al. | |
| 2018/0048550 A1 | 2/2018 | Beyah et al. | |
| 2018/0048567 A1 | 2/2018 | Ignatchenko | |
| 2018/0048628 A1 | 2/2018 | Soon-Shiong et al. | |
| 2018/0048639 A1 | 2/2018 | Inundsam et al. | |
| 2018/0048649 A1 | 2/2018 | Zhang et al. | |
| 2018/0048657 A1 | 2/2018 | Hittel et al. | |
| 2018/0048658 A1 | 2/2018 | Hittel et al. | |
| 2018/0048665 A1 | 2/2018 | Shulman et al. | |
| 2018/0048670 A1 | 2/2018 | Hughes | |
| 2018/0048671 A1 | 2/2018 | Shekyan et al. | |
| 2018/0048716 A1 | 2/2018 | Madhayyan et al. | |
| 2018/0075233 A1* | 3/2018 | Gray | H04L 63/145 |

* cited by examiner

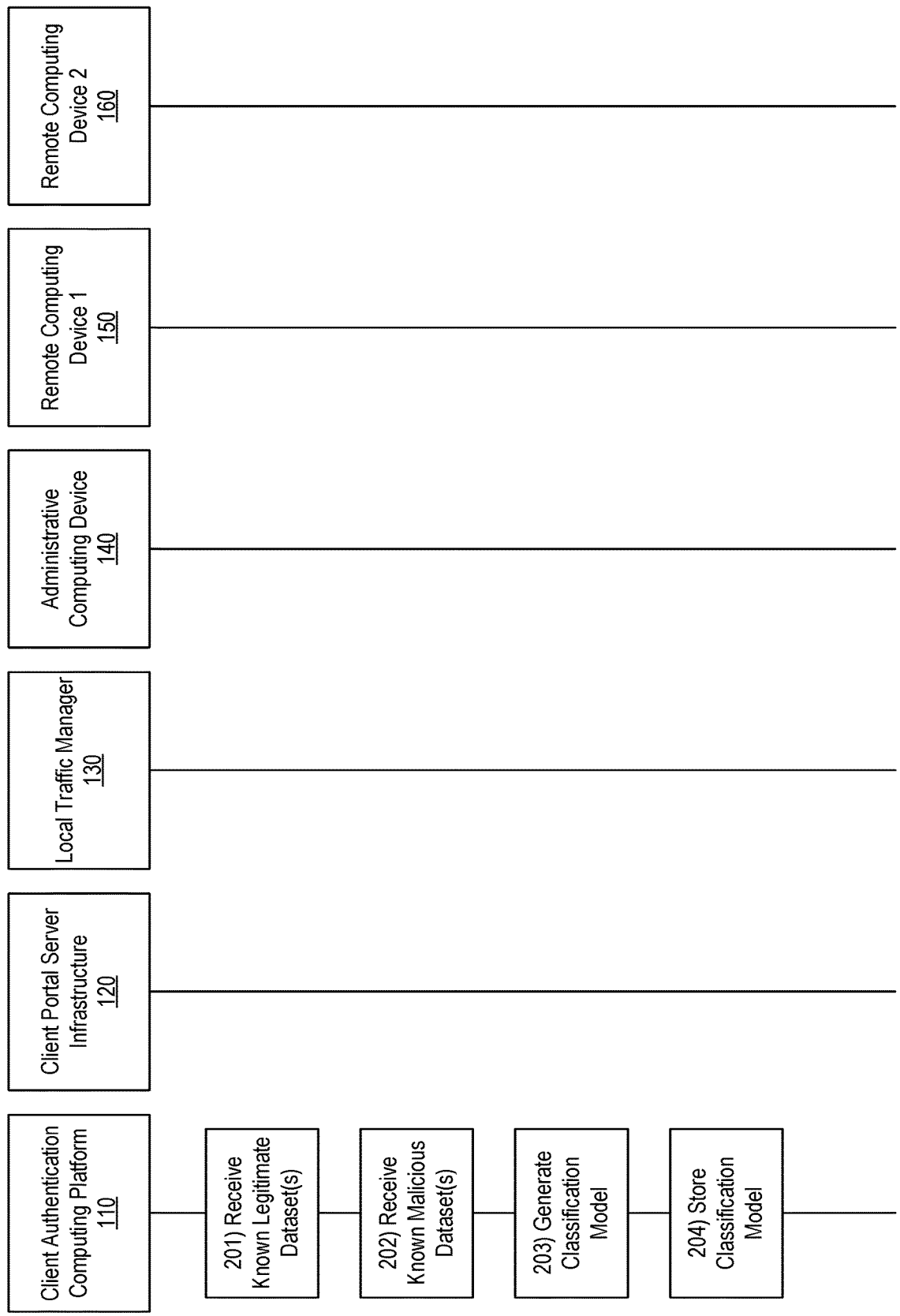

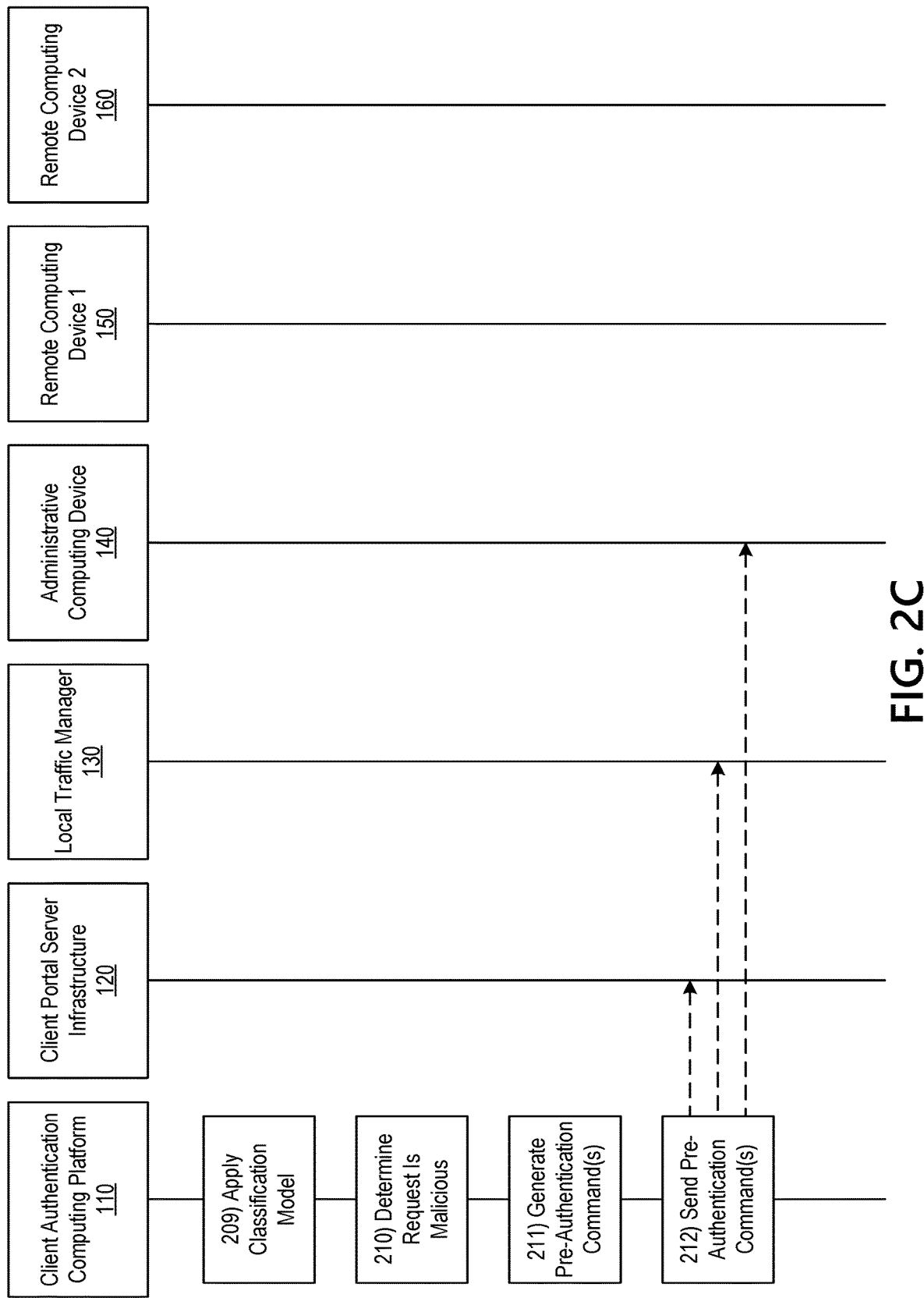

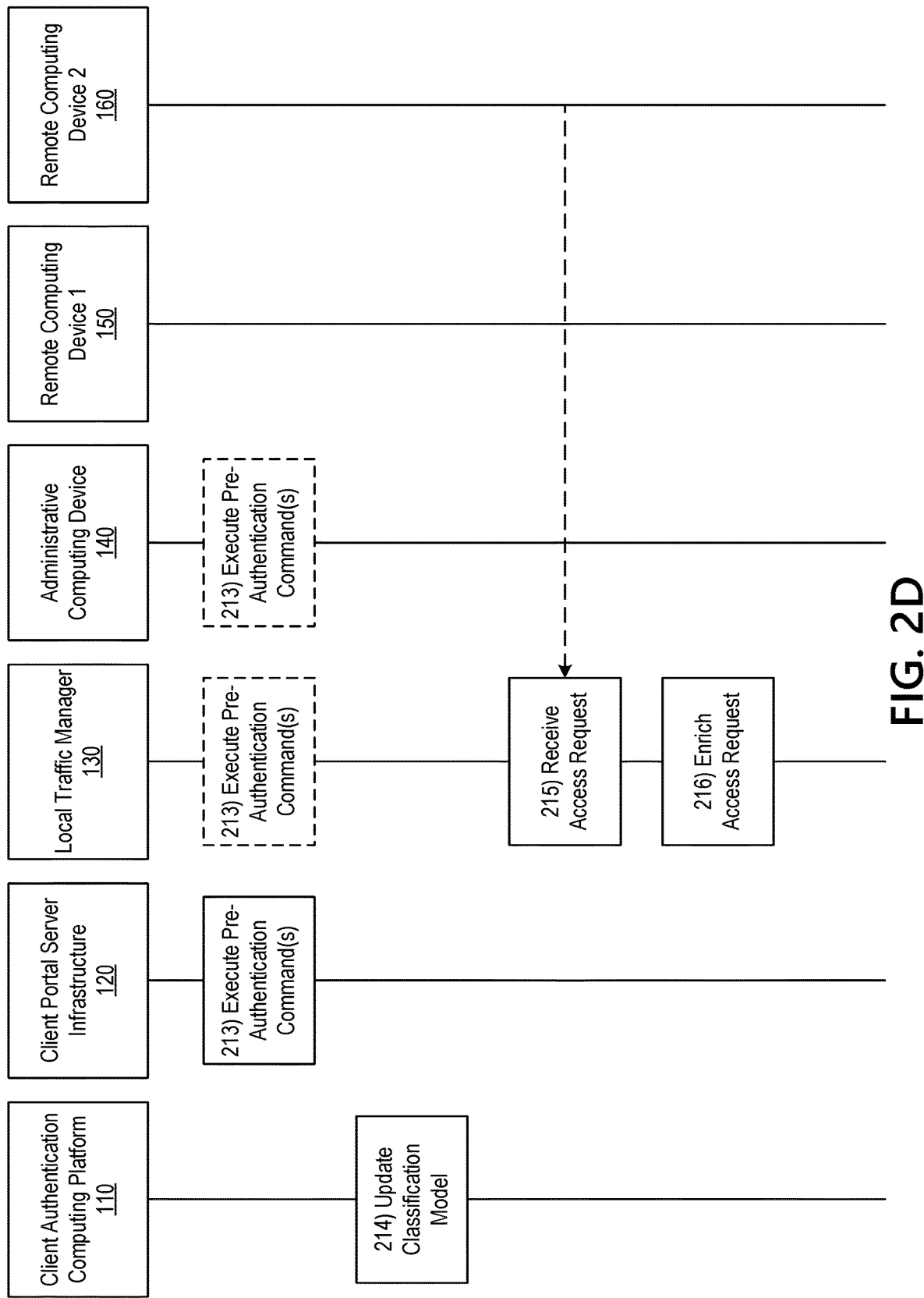

PREVENTING UNAUTHORIZED ACCESS TO SECURE INFORMATION SYSTEMS USING ADVANCED PRE-AUTHENTICATION TECHNIQUES

BACKGROUND

Aspects of the disclosure relate to providing information security and preventing unauthorized access to resources of an information system. In particular, one or more aspects of the disclosure relate to preventing unauthorized access to secured information systems using advanced pre-authentication techniques.

As organizations increasingly provide electronic portals via which various users may access, view, and/or modify information, including client information, ensuring the safety and security of information maintained by such organizations and/or made available via such portals is increasingly important. In many instances, however, it may be difficult to ensure the safety and security of such information while also optimizing the efficient and effective technical operations of the computer systems that maintain such information and/or provide such portals.

SUMMARY

Aspects of the disclosure provide effective, efficient, scalable, and convenient technical solutions that address and overcome the technical problems associated with providing information security and preventing unauthorized access to resources of an information system by implementing advanced pre-authentication techniques.

In accordance with one or more embodiments, a computing platform having at least one processor, a communication interface, and memory may receive, via the communication interface, from a local traffic manager, a first enriched access request associated with a first remote computing device. Based on receiving the first enriched access request associated with the first remote computing device from the local traffic manager, the computing platform may apply a pre-authentication classification model to the first enriched access request associated with the first remote computing device. Based on applying the pre-authentication classification model to the first enriched access request associated with the first remote computing device, the computing platform may determine that the first enriched access request associated with the first remote computing device is likely malicious. Based on determining that the first enriched access request associated with the first remote computing device is likely malicious, the computing platform may generate one or more first pre-authentication response commands directing client portal server infrastructure to process the first enriched access request associated with the first remote computing device as a malicious request. Subsequently, the computing platform may send, via the communication interface, to the client portal server infrastructure, the one or more first pre-authentication response commands directing the client portal server infrastructure to process the first enriched access request associated with the first remote computing device as a malicious request.

In some embodiments, receiving the first enriched access request associated with the first remote computing device from the local traffic manager may include receiving, from the local traffic manager, one or more hypertext transfer protocol (HTTP) headers originating from a first access request received by the local traffic manager from the first remote computing device and additional enrichment information generated by the local traffic manager based on the first access request received by the local traffic manager from the first remote computing device.

In some embodiments, applying the pre-authentication classification model to the first enriched access request associated with the first remote computing device may include using a dependent probability machine learning model to calculate a probability that the first enriched access request associated with the first remote computing device is likely malicious based on the one or more HTTP headers originating from the first access request received by the local traffic manager from the first remote computing device and based on the additional enrichment information generated by the local traffic manager. In addition, based on the probability calculated using the dependent probability machine learning model exceeding a predetermined threshold, the computing platform may determine that the first enriched access request associated with the first remote computing device is likely malicious.

In some embodiments, sending the one or more first pre-authentication response commands directing the client portal server infrastructure to process the first enriched access request associated with the first remote computing device as a malicious request may cause the client portal server infrastructure to deny access to the first remote computing device.

In some embodiments, sending the one or more first pre-authentication response commands directing the client portal server infrastructure to process the first enriched access request associated with the first remote computing device as a malicious request may cause the client portal server infrastructure to connect the first remote computing device to a honeypot site in which actual user account information is not accessible.

In some embodiments, sending the one or more first pre-authentication response commands directing the client portal server infrastructure to process the first enriched access request associated with the first remote computing device as a malicious request may cause the client portal server infrastructure to throttle communications associated with the first remote computing device.

In some embodiments, sending the one or more first pre-authentication response commands directing the client portal server infrastructure to process the first enriched access request associated with the first remote computing device as a malicious request may cause the client portal server infrastructure to require step-up authentication credentials from the first remote computing device.

In some embodiments, prior to receiving the first enriched access request associated with the first remote computing device from the local traffic manager, the computing platform may receive a known legitimate request reference dataset comprising HTTP header information associated with verified legitimate requests. In addition, the computing platform may receive a known malicious request reference dataset comprising HTTP header information associated with verified malicious requests. Subsequently, the computing platform may generate the pre-authentication classification model based on the known legitimate request reference dataset and the known malicious request reference dataset. Then, the computing platform may store the pre-authentication classification model generated based on the known legitimate request reference dataset and the known malicious request reference dataset.

In some embodiments, after sending the one or more first pre-authentication response commands to the client portal server infrastructure, the computing platform may update the pre-authentication classification model based on determining that the first enriched access request associated with the first remote computing device is likely malicious.

In some embodiments, the computing platform may receive, via the communication interface, from the local traffic manager, a second enriched access request associated with a second remote computing device. Based on receiving the second enriched access request associated with the second remote computing device from the local traffic manager, the computing platform may apply the pre-authentication classification model to the second enriched access request associated with the second remote computing device. Based on applying the pre-authentication classification model to the second enriched access request associated with the second remote computing device, the computing platform may determine that the second enriched access request associated with the second remote computing device is likely not malicious. Based on determining that the second enriched access request associated with the second remote computing device is likely not malicious, the computing platform may generate one or more second pre-authentication response commands directing the client portal server infrastructure to process the second enriched access request associated with the second remote computing device as a legitimate request. Subsequently, the computing platform may send, via the communication interface, to the client portal server infrastructure, the one or more second pre-authentication response commands directing the client portal server infrastructure to process the second enriched access request associated with the second remote computing device as a legitimate request.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for preventing unauthorized access to secured information systems using advanced pre-authentication techniques in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
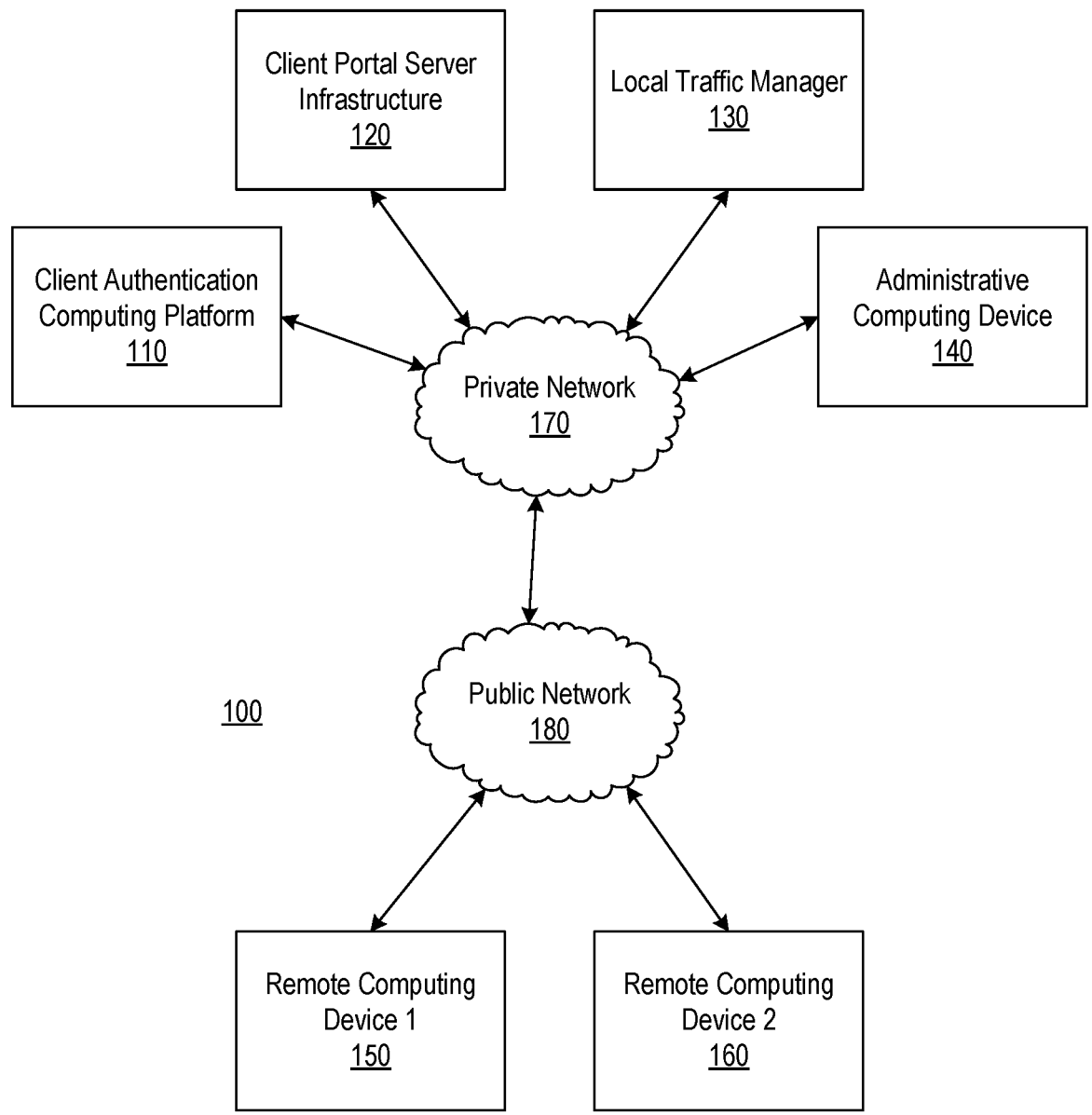
FIGS. 1A and 1B depict an illustrative computing environment for preventing unauthorized access to secured information systems using advanced pre-authentication techniques in accordance with one or more example embodiments.
Figure 1B:
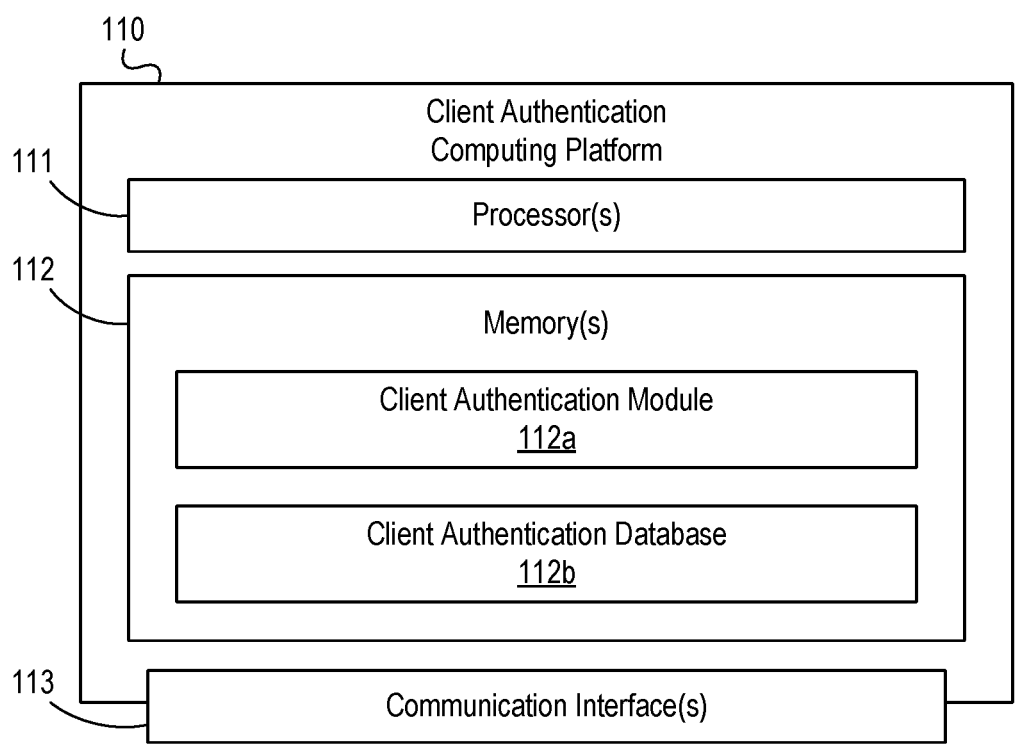

FIGS. 1A and 1B depict an illustrative computing environment for preventing unauthorized access to secured information systems using advanced pre-authentication techniques in accordance with one or more example embodiments. Referring to FIG. 1A, computing environment 100 may include one or more computer systems. For example, computing environment 100 may include a client authentication computing platform 110, client portal server infrastructure 120, a local traffic manager 130, an administrative computing device 140, a first remote computing device 150, and a second remote computing device 160.

As illustrated in greater detail below, client authentication computing platform 110 may include one or more computing devices configured to perform one or more of the functions described herein. For example, client authentication computing platform 110 may include one or more computers (e.g., laptop computers, desktop computers, servers, server blades, or the like).

Client portal server infrastructure 120 may include one or more computing devices and/or other computer components (e.g., processors, memories, communication interfaces). In addition, and as illustrated in greater detail below, client portal server infrastructure 120 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by client portal server infrastructure 120 may be associated with a client portal provided by an organization, such as an online banking portal or a mobile banking portal provided by a financial institution. Such a portal may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Local traffic manager 130 may be a computer system that includes one or more computing devices and/or other computer components (e.g., processors, memories, communication interfaces). In addition, local traffic manager 130 may be configured to receive requests (e.g., requests for web pages associated with a client portal provided by client portal server infrastructure 120) from one or more remote computing devices and/or perform various load balancing functions with respect to such requests. Local traffic manager 130 also may be configured to selectively enrich such requests and/or forward such requests to other systems and/or devices included in computing environment 100 to enable one or more advanced pre-authentication techniques and/or other functions to be performed, as illustrated in greater detail below.

Remote computing device 150 may be a personal computing device (e.g., desktop computer, laptop computer) or mobile computing device (e.g., smartphone, tablet) that may be linked to and/or used by a first user. Remote computing device 160 may be a personal computing device (e.g., desktop computer, laptop computer) or mobile computing device (e.g., smartphone, tablet) that may be linked to and/or used by a second user different from the first user. In some instances, one or more of remote computing device 150 and/or remote computing device 160 may be infected with malicious software and/or used by a malicious user to submit malicious requests to client authentication computing platform 110, client portal server infrastructure 120, and/or local traffic manager 130. Such requests may be identified, filtered, blocked, and/or otherwise responded to by client authentication computing platform 110, client portal server infrastructure 120, and/or local traffic manager 130 using one or more advanced pre-authentication techniques, as discussed in greater detail below.

Computing environment 100 also may include one or more networks, which may interconnect one or more of client authentication computing platform 110, client portal server infrastructure 120, local traffic manager 130, administrative computing device 140, remote computing device 150, and remote computing device 160. For example, computing environment 100 may include a private network 170 (which may, e.g., interconnect client authentication computing platform 110, client portal server infrastructure 120, local traffic manager 130, and administrative computing device 140) and public network 180 (which may, e.g., interconnect remote computing device 150 and remote computing device 160 with private network 170 and/or one or more other systems, public networks, sub-networks, and/or the like).

In one or more arrangements, administrative computing device 140, remote computing device 150, remote computing device 160, and/or the other systems included in computing environment 100 may be any type of computing device capable of receiving a user interface, receiving input via the user interface, and communicating the received input to one or more other computing devices. For example, administrative computing device 140, remote computing device 150, remote computing device 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client authentication computing platform 110, client portal server infrastructure 120, local traffic manager 130, administrative computing device 140, remote computing device 150, and remote computing device 160 may, in some instances, be special-purpose computing devices configured to perform specific functions.

Referring to FIG. 1B, client authentication computing platform 110 may include one or more processors 111, memory 112, and communication interface 113. A data bus may interconnect processor 111, memory 112, and communication interface 113. Communication interface 113 may be a network interface configured to support communication between client authentication computing platform 110 and one or more networks (e.g., network 170, network 180, or the like). Memory 112 may include one or more program modules having instructions that when executed by processor 111 cause client authentication computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of client authentication computing platform 110 and/or by different computing devices that may form and/or otherwise make up client authentication computing platform 110. For example, memory 112 may have, store, and/or include a client authentication module 112a and a client authentication database 112b. Client authentication module 112a may have instructions that direct and/or cause client authentication computing platform 110 to control access to resources of an information system by implementing advanced pre-authentication techniques, as discussed in greater detail below. Client authentication database 112b may store information used by client authentication module 112a and/or client authentication computing platform 110 in controlling access to resources of an information system by implementing advanced pre-authentication techniques and/or in performing other functions.

Figure 2B:
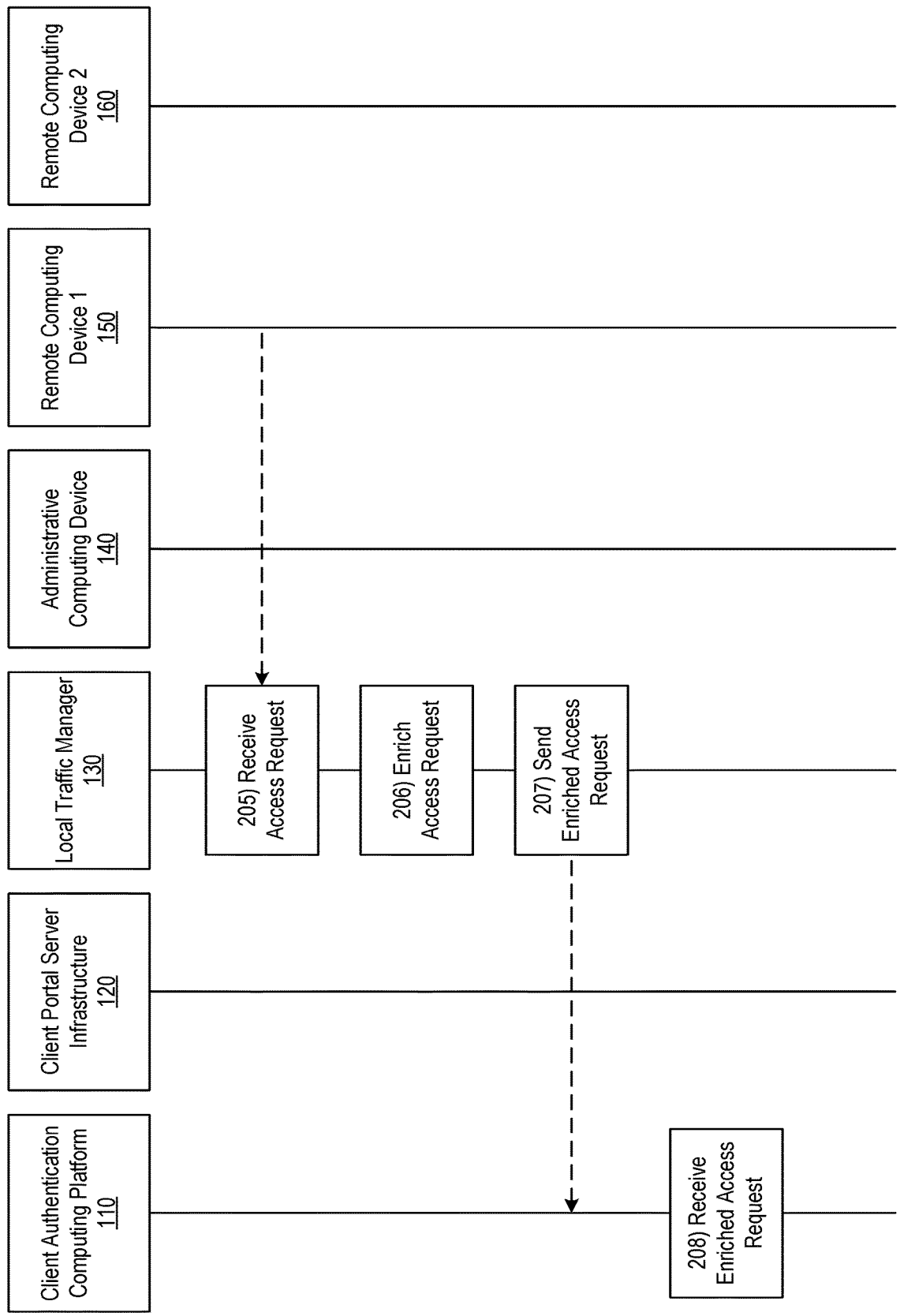

FIGS. 2A-2F depict an illustrative event sequence for preventing unauthorized access to secured information systems using advanced pre-authentication techniques in accordance with one or more example embodiments. Referring to FIG. 2A, at step 201, client authentication computing platform 110 may receive a dataset identifying past requests that were identified as legitimate. For example, at step 201, client authentication computing platform 110 may receive a known legitimate request reference dataset comprising hypertext transfer protocol (HTTP) header information associated with verified legitimate requests. These verified legitimate requests may be and/or correspond to previous web requests received by client portal server infrastructure 120, local traffic manager 130, and/or other systems and/or devices included in computing environment 100. In addition, the known legitimate request reference dataset may include request information identifying a timestamp for each request included in the dataset, header information (e.g., contents of and/or other information associated with various HTTP headers) for each request included in the dataset, an indication that the particular request was verified to be legitimate for each request included in the dataset, and/or other information associated with each request included in the dataset. For instance, the header information may include, for each request, the contents of one or more HTTP headers associated with the particular request, such as the contents of an "Accept" header, an "Accept-Charset" header, an "Accept-Encoding" header, an "Accept-Language" header, an "Accept-Datetime" header, an "Access-Control-Request-Method" header, an "Access-Control-Request-Headers" header, an "Authorization" header, a "Cache-Control" header, a "Connection" header, a "Cookie" header, a "Content-Length" header, a "Content-MD5" header, a "Content-Type" header, a "Date" header, an "Expect" header, a "Forwarded" header, a "From" header, a "Host" header, an "If-Match" header, an "If-Modified-Since" header, an "If-None-Match" header, an "If-Range" header, an "If-Unmodified-Since" header, a "Max-Forwards" header, an "Origin" header, a "Pragma" header, a "Proxy-Authorization" header, a "Range" header, a "Referer" header, a "TE" header, a "User-Agent" header, an "Upgrade" header, a "Via" header, a "Warning" header, and/or one or more other headers. As illustrated in greater detail below, any and/or all of these headers may be used by client authentication computing platform 110 in generating a classification model based on passed legitimate and malicious requests and subsequently using the classification model to identify and respond to potentially malicious requests in the future when implementing one or more pre-authentication techniques in accordance with one or more aspects of the disclosure. In some instances, information about previous legitimate requests may be received by client authentication computing platform 110 from client portal server infrastructure 120, administrative computing device 140, and/or other systems and/or devices in computing environment 100 based on valid requests previously handled by such systems and/or devices.

At step 202, client authentication computing platform 110 may receive a dataset identifying past requests that were identified as malicious. For example, at step 202, client authentication computing platform 110 may receive a known malicious request reference dataset comprising HTTP header information associated with verified malicious requests. These verified malicious requests may be and/or correspond to previous web requests received by client portal server infrastructure 120, local traffic manager 130, and/or other systems and/or devices included in computing environment 100, that were determined to be malicious in nature (e.g., originating from a computer system or device infected with malware and/or being used by a malicious user in an attempt to gain unauthorized access to a user account). In addition, the known malicious request reference dataset may include request information identifying a timestamp for each request included in the dataset, header information (e.g., contents of and/or other information associated with various HTTP headers) for each request included in the dataset, an indication that the particular request was verified to be malicious for each request included in the dataset, and/or other information associated with each request included in the dataset. For instance, the header information may include, for each request, the contents of one or more HTTP headers associated with the particular request, such as the contents of one or more of the example headers listed above and/or one or more other headers. In some instances, information about previous malicious requests may be received by client authentication computing platform 110 from client portal server infrastructure 120, administrative computing device 140, and/or other systems and/or devices in computing environment 100 based on malicious requests previously handled by such systems and/or devices (e.g., previously identified cases in which attempts at unauthorized access, botnet attacks, and/or other malicious events occurred and/or were identified).

At step 203, client authentication computing platform 110 may generate a classification model. For example, at step 203, client authentication computing platform 110 may generate a pre-authentication classification model based on the known legitimate request reference dataset and the known malicious request reference dataset. In some instances, client authentication computing platform 110 may generate such a classification model using one or more machine learning (ML) application programming interfaces (APIs) that enable client authentication computing platform 110 to generate a dependent probability model, a regression model, a decision tree model, a random forest model, and/or one or more other classification models based on one or more input datasets. At step 204, client authentication computing platform 110 may store the classification model. For example, at step 204, client authentication computing platform 110 may store the pre-authentication classification model generated based on the known legitimate request reference dataset and the known malicious request reference dataset.

Referring to FIG. 2B, at step 205, local traffic manager 130 may receive a first access request from remote computing device 150. The first access request may, for instance, be an HTTP request for a web page or site hosted by client portal server infrastructure 120 and/or otherwise provided by an organization operating client authentication computing platform 110, client portal server infrastructure 120, and/or local traffic manager 130, such as a client portal (e.g., an online banking portal, a mobile banking portal, or the like).

At step 206, local traffic manager 130 may enrich the first access request to produce a first enriched access request. In enriching the first access request, local traffic manager 130 may, for instance, create a data structure that includes information obtained from the first access request and additional information generated by local traffic manager 130 based on the first access request. The data structure created by local traffic manager 130 may be and/or correspond to the first enriched access request (which may, e.g., be forwarded on to client authentication computing platform 110 for analysis, as discussed in greater detail below). For example, in creating the data structure that makes up the first enriched access request, local traffic manager 130 may insert, into the data structure, the contents of the HTTP headers associated with the first access request, information identifying the order of the HTTP headers in the first access request, secure sockets layer (SSL) details associated with the first access request (which might, e.g., otherwise be lost if local traffic manager 130 merely forwarded the first access request to other systems and/or devices included in computing environment 100), custom headers generated by local traffic manager 130 based on the first access request received from remote computing device 150, and/or other information generated by local traffic manager 130 based on the first access request received from remote computing device 150.

At step 207, local traffic manager 130 may send the first enriched access request to client authentication computing platform 110. At step 208, client authentication computing platform 110 may receive the first enriched access request from local traffic manager 130. For example, at step 208, client authentication computing platform 110 may receive, via the communication interface (e.g., communication interface 113), from a local traffic manager (e.g., local traffic manager 130), a first enriched access request associated with a first remote computing device (e.g., remote computing device 150).

In some embodiments, receiving the first enriched access request associated with the first remote computing device from the local traffic manager may include receiving, from the local traffic manager, one or more hypertext transfer protocol (HTTP) headers originating from a first access request received by the local traffic manager from the first remote computing device and additional enrichment information generated by the local traffic manager based on the first access request received by the local traffic manager from the first remote computing device. For example, in receiving the first enriched access request associated with the first remote computing device (e.g., remote computing device 150) from the local traffic manager (e.g., local traffic manager 130), client authentication computing platform 110 may receive, from the local traffic manager (e.g., local traffic manager 130), one or more hypertext transfer protocol (HTTP) headers originating from a first access request received by the local traffic manager (e.g., local traffic manager 130) from the first remote computing device (e.g., remote computing device 150) and additional enrichment information generated by the local traffic manager (e.g., local traffic manager 130) based on the first access request received by the local traffic manager (e.g., local traffic manager 130) from the first remote computing device (e.g., remote computing device 150). Such enrichment information may, for instance, include the other information inserted into the data structure associated with the first enriched access request, in addition to the actual contents of the HTTP headers from the original request, as discussed in the example above.

Referring to FIG. 2C, at step 209, client authentication computing platform 110 may apply a classification model to the first enriched access request. For example, at step 209, based on receiving the first enriched access request associated with the first remote computing device (e.g., remote computing device 150) from the local traffic manager (e.g., local traffic manager 130), client authentication computing platform 110 may apply a pre-authentication classification model to the first enriched access request associated with the first remote computing device (e.g., remote computing device 150). For instance, in applying the pre-authentication classification model to the first enriched access request associated with the first remote computing device (e.g., remote computing device 150), client authentication computing platform 110 may apply and/or otherwise use the classification model generated at step 203 to determine whether the first enriched access request associated with the first remote computing device (e.g., remote computing device 150) is likely malicious or legitimate (e.g., based on the HTTP headers and/or other information associated with the access request).

In some embodiments, applying the pre-authentication classification model to the first enriched access request associated with the first remote computing device may include: using a dependent probability machine learning model to calculate a probability that the first enriched access request associated with the first remote computing device is likely malicious based on the one or more HTTP headers originating from the first access request received by the local traffic manager from the first remote computing device and based on the additional enrichment information generated by the local traffic manager; and based on the probability calculated using the dependent probability machine learning model exceeding a predetermined threshold, determining that the first enriched access request associated with the first remote computing device is likely malicious. For example, in applying the pre-authentication classification model to the first enriched access request associated with the first remote computing device (e.g., remote computing device 150), client authentication computing platform 110 may use a dependent probability machine learning model to calculate a probability that the first enriched access request associated with the first remote computing device (e.g., remote computing device 150) is likely malicious based on the one or more HTTP headers originating from the first access request received by the local traffic manager (e.g., local traffic manager 130) from the first remote computing device (e.g., remote computing device 150) and based on the additional enrichment information generated by the local traffic manager (e.g., local traffic manager 130). In addition, based on the probability calculated using the dependent probability machine learning model exceeding a predetermined threshold, client authentication computing platform 110 may determine that the first enriched access request associated with the first remote computing device (e.g., remote computing device 150) is likely malicious.

For instance, multiple probability values may be calculated and/or otherwise generated by client authentication computing platform 110 in building the pre-authentication classification model based on the known legitimate request reference dataset and the known malicious request reference dataset (e.g., at step 203). And in calculating (e.g., at step 209) the probability that the first enriched access request associated with the first remote computing device (e.g., remote computing device 150) is likely malicious based on the one or more HTTP headers originating from the first access request received by the local traffic manager (e.g., local traffic manager 130) from the first remote computing device (e.g., remote computing device 150) and based on the additional enrichment information generated by the local traffic manager (e.g., local traffic manager 130), client authentication computing platform 110 may calculate the probability by determining how many headers and/or other elements in the first enriched access request match features of previous known malicious requests (e.g., as identified in the known malicious request reference dataset and/or as defined in the pre-authentication classification model), where each match may increase the probability that the first enriched access request is malicious by a predetermined step amount, and/or by determining how many headers and/or other elements in the first enriched access request match features of previous known legitimate requests (e.g., as identified in the known legitimate request reference dataset and/or as defined in the pre-authentication classification model), where each match may decrease the probability that the first enriched access request is malicious by a predetermined step amount. In other instances, client authentication computing platform 110 may use one or more other machine learning models instead of or in addition to a dependent probability model, such as regression models, decision tree models, random forest models, or the like. In addition, the client authentication computing platform 110 may adjust the predetermined threshold probability value used in determining whether a particular access request is likely malicious over time as client authentication computing platform 110 analyzes more requests.

At step 210, client authentication computing platform 110 may determine that the first enriched access request is likely malicious. For example, at step 210, based on applying the pre-authentication classification model to the first enriched access request associated with the first remote computing device (e.g., remote computing device 150), client authentication computing platform 110 may determine that the first enriched access request associated with the first remote computing device (e.g., remote computing device 150) is likely malicious. For instance, client authentication computing platform 110 may make this determination based on the calculated probability exceeding the predetermined threshold, as discussed in the example above.

At step 211, client authentication computing platform 110 may generate one or more pre-authentication response commands. For example, at step 211, based on determining that the first enriched access request associated with the first remote computing device (e.g., remote computing device 150) is likely malicious, client authentication computing platform 110 may generate one or more first pre-authentication response commands directing client portal server infrastructure (e.g., client portal server infrastructure 120) to process the first enriched access request associated with the first remote computing device (e.g., remote computing device 150) as a malicious request. Additionally or alternatively, client authentication computing platform 110 may generate one or more pre-authentication response commands that cause local traffic manager 130 and/or administrative computing device 140 to perform various actions, such as throttling and/or limiting communications and/or presenting one or more alerts and/or other notifications.

At step 212, client authentication computing platform 110 may send the one or more pre-authentication response commands to client portal server infrastructure 120 (and/or to local traffic manager 130 and/or administrative computing device 140, depending on what commands were generated at step 211). For example, at step 212, client authentication computing platform 110 may send, via the communication interface (e.g., communication interface 113), to the client portal server infrastructure (e.g., client portal server infrastructure 120), the one or more first pre-authentication response commands directing the client portal server infrastructure (e.g., client portal server infrastructure 120) to process the first enriched access request associated with the first remote computing device (e.g., remote computing device 150) as a malicious request.

In some embodiments, sending the one or more first pre-authentication response commands directing the client portal server infrastructure to process the first enriched access request associated with the first remote computing device as a malicious request may cause the client portal server infrastructure to deny access to the first remote computing device. For example, in sending the one or more first pre-authentication response commands directing the client portal server infrastructure (e.g., client portal server infrastructure 120) to process the first enriched access request associated with the first remote computing device (e.g., remote computing device 150) as a malicious request, client authentication computing platform 110 may cause the client portal server infrastructure (e.g., client portal server infrastructure 120) to deny access to the first remote computing device (e.g., remote computing device 150). This may, for instance, prevent remote computing device 150 from accessing a client portal hosted by client portal server infrastructure 120.

In some embodiments, sending the one or more first pre-authentication response commands directing the client portal server infrastructure to process the first enriched access request associated with the first remote computing device as a malicious request may cause the client portal server infrastructure to connect the first remote computing device to a honeypot site in which actual user account information is not accessible. For example, in sending the one or more first pre-authentication response commands directing the client portal server infrastructure (e.g., client portal server infrastructure 120) to process the first enriched access request associated with the first remote computing device (e.g., remote computing device 150) as a malicious request, client authentication computing platform 110 may cause the client portal server infrastructure (e.g., client portal server infrastructure 120) to connect the first remote computing device (e.g., remote computing device 150) to a honeypot site in which actual user account information is not accessible. This may, for instance, prevent remote computing device 150 from accessing actual user account information and/or an actual client portal hosted by client portal server infrastructure 120 and instead may enable remote computing device 150 to interact with a simulated portal site that does not include any actual account information or functions.

In some embodiments, sending the one or more first pre-authentication response commands directing the client portal server infrastructure to process the first enriched access request associated with the first remote computing device as a malicious request may cause the client portal server infrastructure to throttle communications associated with the first remote computing device. For example, in sending the one or more first pre-authentication response commands directing the client portal server infrastructure (e.g., client portal server infrastructure 120) to process the first enriched access request associated with the first remote computing device (e.g., remote computing device 150) as a malicious request, client authentication computing platform 110 may cause the client portal server infrastructure (e.g., client portal server infrastructure 120) to throttle communications associated with the first remote computing device (e.g., remote computing device 150). This may, for instance, cause remote computing device 150 to experienced decreased performance when attempting to interact with a client portal and/or other information hosted by client portal server infrastructure 120.

In some embodiments, sending the one or more first pre-authentication response commands directing the client portal server infrastructure to process the first enriched access request associated with the first remote computing device as a malicious request may cause the client portal server infrastructure to require step-up authentication credentials from the first remote computing device. For example, in sending the one or more first pre-authentication response commands directing the client portal server infrastructure (e.g., client portal server infrastructure 120) to process the first enriched access request associated with the first remote computing device (e.g., remote computing device 150) as a malicious request, client authentication computing platform 110 may cause the client portal server infrastructure (e.g., client portal server infrastructure 120) to require step-up authentication credentials from the first remote computing device (e.g., remote computing device 150). This may, for instance, cause client portal server infrastructure 120 to prompt remote computing device 150 to provide one or more answers to one or more security challenge questions, one or more one-time passcodes, and/or the like, in addition to username and/or password credentials, to gain access to a client portal and/or other information hosted by client portal server infrastructure 120.

Referring to FIG. 2D, at step 213, client portal server infrastructure 120 may execute the one or more first pre-authentication response commands received from client authentication computing platform 110. Additionally or alternatively, local traffic manager 130 and/or administrative computing device 140 may execute such commands, depending on what pre-authentication response commands were generated and/or sent by client authentication computing platform 110. As discussed in the examples above, this execution may cause client portal server infrastructure 120 to deny access to remote computing device 150, may direct remote computing device 150 to a honeypot site, may throttle communications with remote computing device 150, may require remote computing device 150 to provide step-up authentication credentials, and/or the like. Additionally or alternatively, this execution may cause local traffic manager 130 to reconfigure communication settings used when exchanging information with remote computing device 150 and/or may cause administrative computing device 140 to present one or more alerts and/or other notifications (e.g., indicating that requests and/or other communications received from remote computing device 150 are likely malicious).

At step 214, client authentication computing platform 110 may update the classification model. For example, at step 214, after sending the one or more first pre-authentication response commands to the client portal server infrastructure (e.g., client portal server infrastructure 120), client authentication computing platform 110 may update the pre-authentication classification model based on determining that the first enriched access request associated with the first remote computing device (e.g., remote computing device 150) is likely malicious. For instance, client authentication computing platform 110 may add information associated with the first enriched access request to the classification model and/or other records for use in the future as another data point in identifying likely malicious requests.

At step 215, local traffic manager 130 may receive a second access request from remote computing device 160. The second access request may, for instance, be an HTTP request for a web page or site hosted by client portal server infrastructure 120 and/or otherwise provided by an organization operating client authentication computing platform 110, client portal server infrastructure 120, and/or local traffic manager 130, such as a client portal (e.g., an online banking portal, a mobile banking portal, or the like).

At step 216, local traffic manager 130 may enrich the second access request to produce a second enriched access request. In enriching the second access request, local traffic manager 130 may, for instance, create a data structure that includes information obtained from the second access request and additional information generated by local traffic manager 130 based on the second access request. The data structure created by local traffic manager 130 may be and/or correspond to the second enriched access request (which may, e.g., be forwarded on to client authentication computing platform 110 for analysis, as discussed in greater detail below). For example, in creating the data structure that makes up the second enriched access request, local traffic manager 130 may insert, into the data structure, the contents of the HTTP headers associated with the second access request, information identifying the order of the HTTP headers in the second access request, secure sockets layer (SSL) details associated with the second access request (which might, e.g., otherwise be lost if local traffic manager 130 merely forwarded the second access request to other systems and/or devices included in computing environment 100), custom headers generated by local traffic manager 130 based on the second access request received from remote computing device 160, and/or other information generated by local traffic manager 130 based on the second access request received from remote computing device 160.

Figure 2E:
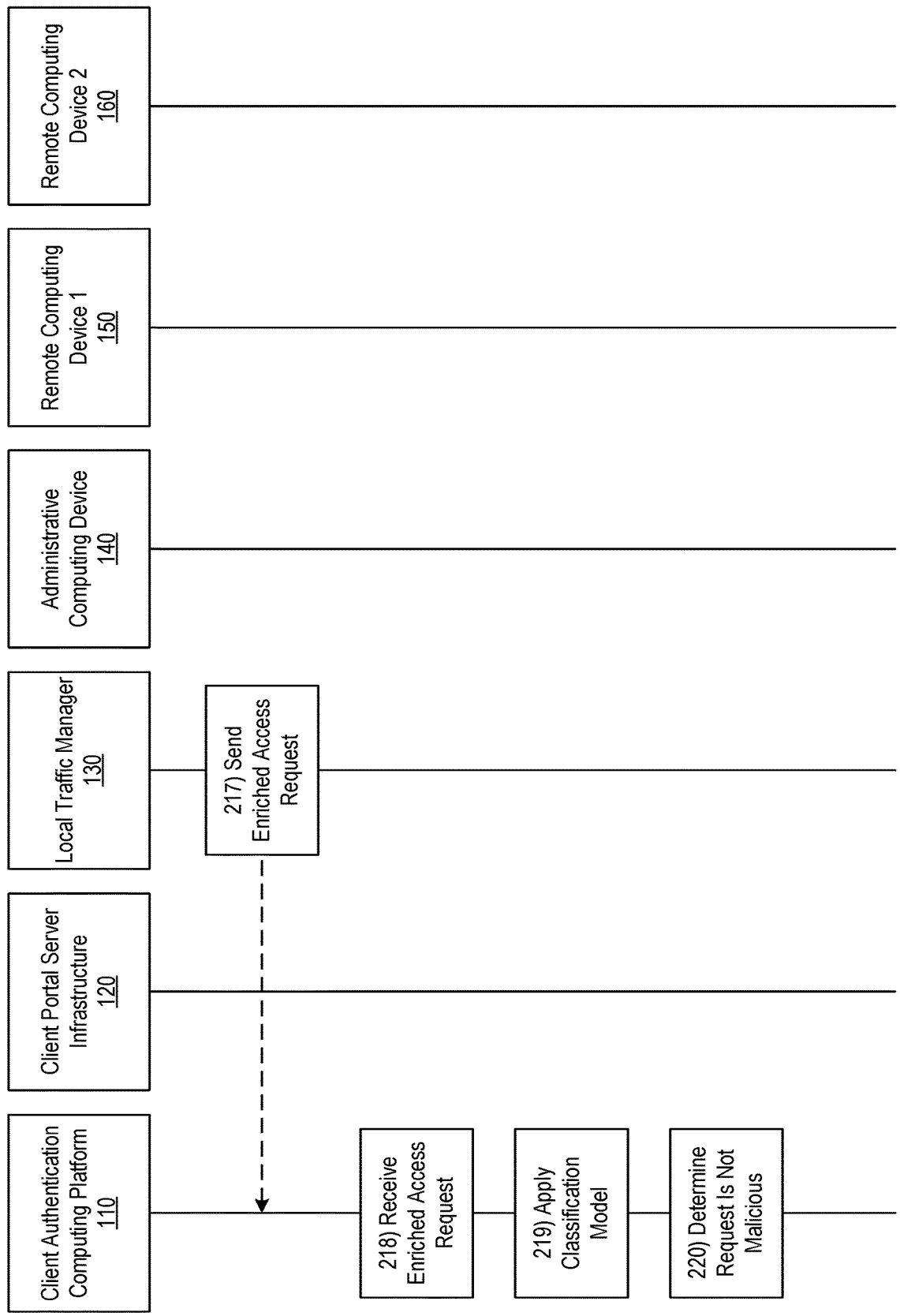

Referring to FIG. 2E, at step 217, local traffic manager 130 may send the second enriched access request to client authentication computing platform 110. At step 218, client authentication computing platform 110 may receive the second enriched access request from local traffic manager 130. For example, at step 218, client authentication computing platform 110 may receive, via the communication interface (e.g., communication interface 113), from the local traffic manager (e.g., local traffic manager 130), a second enriched access request associated with a second remote computing device (e.g., remote computing device 160).

In some embodiments, receiving the second enriched access request associated with the second remote computing device from the local traffic manager may include receiving, from the local traffic manager, one or more hypertext transfer protocol (HTTP) headers originating from a second access request received by the local traffic manager from the second remote computing device and additional enrichment information generated by the local traffic manager based on the second access request received by the local traffic manager from the second remote computing device. For example, in receiving the second enriched access request associated with the second remote computing device (e.g., remote computing device 160) from the local traffic manager (e.g., local traffic manager 130), client authentication computing platform 110 may receive, from the local traffic manager (e.g., local traffic manager 130), one or more hypertext transfer protocol (HTTP) headers originating from a second access request received by the local traffic manager (e.g., local traffic manager 130) from the second remote computing device (e.g., remote computing device 160) and additional enrichment information generated by the local traffic manager (e.g., local traffic manager 130) based on the second access request received by the local traffic manager (e.g., local traffic manager 130) from the second remote computing device (e.g., remote computing device 160). Such enrichment information may, for instance, include the other information inserted into the data structure associated with the second enriched access request, in addition to the actual contents of the HTTP headers from the original request, as discussed in the examples above.

At step 219, client authentication computing platform 110 may apply a classification model to the second enriched access request. For example, at step 219, based on receiving the second enriched access request associated with the second remote computing device (e.g., remote computing device 160) from the local traffic manager (e.g., local traffic manager 130), client authentication computing platform 110 may apply the pre-authentication classification model to the second enriched access request associated with the second remote computing device (e.g., remote computing device 160). For instance, in applying the pre-authentication classification model to the second enriched access request associated with the second remote computing device (e.g., remote computing device 160), client authentication computing platform 110 may apply and/or otherwise use the classification model generated at step 203 and/or updated at step 214 to determine whether the second enriched access request associated with the second remote computing device (e.g., remote computing device 160) is likely malicious or legitimate (e.g., based on the HTTP headers and/or other information associated with the access request), similar to how client authentication computing platform 110 may apply and/or otherwise use the classification model generated at step 203 to determine whether the first enriched access request associated with the first remote computing device (e.g., remote computing device 150) is likely malicious or legitimate, as discussed in the examples above.

At step 220, client authentication computing platform 110 may determine that the second enriched access request is likely not malicious (e.g., and instead is legitimate). For example, at step 220, based on applying the pre-authentication classification model to the second enriched access request associated with the second remote computing device (e.g., remote computing device 160), client authentication computing platform 110 may determine that the second enriched access request associated with the second remote computing device (e.g., remote computing device 160) is likely not malicious. For instance, client authentication computing platform 110 may make this determination by calculating a probability (e.g., similar to how such a probability may be calculated in the examples above discussed with respect to the first enriched access request) and determining that the calculated probability exceeds a predetermined threshold (e.g., similar to how such a threshold may be used in the examples above discussed with respect to the first enriched access request).

Figure 2F:
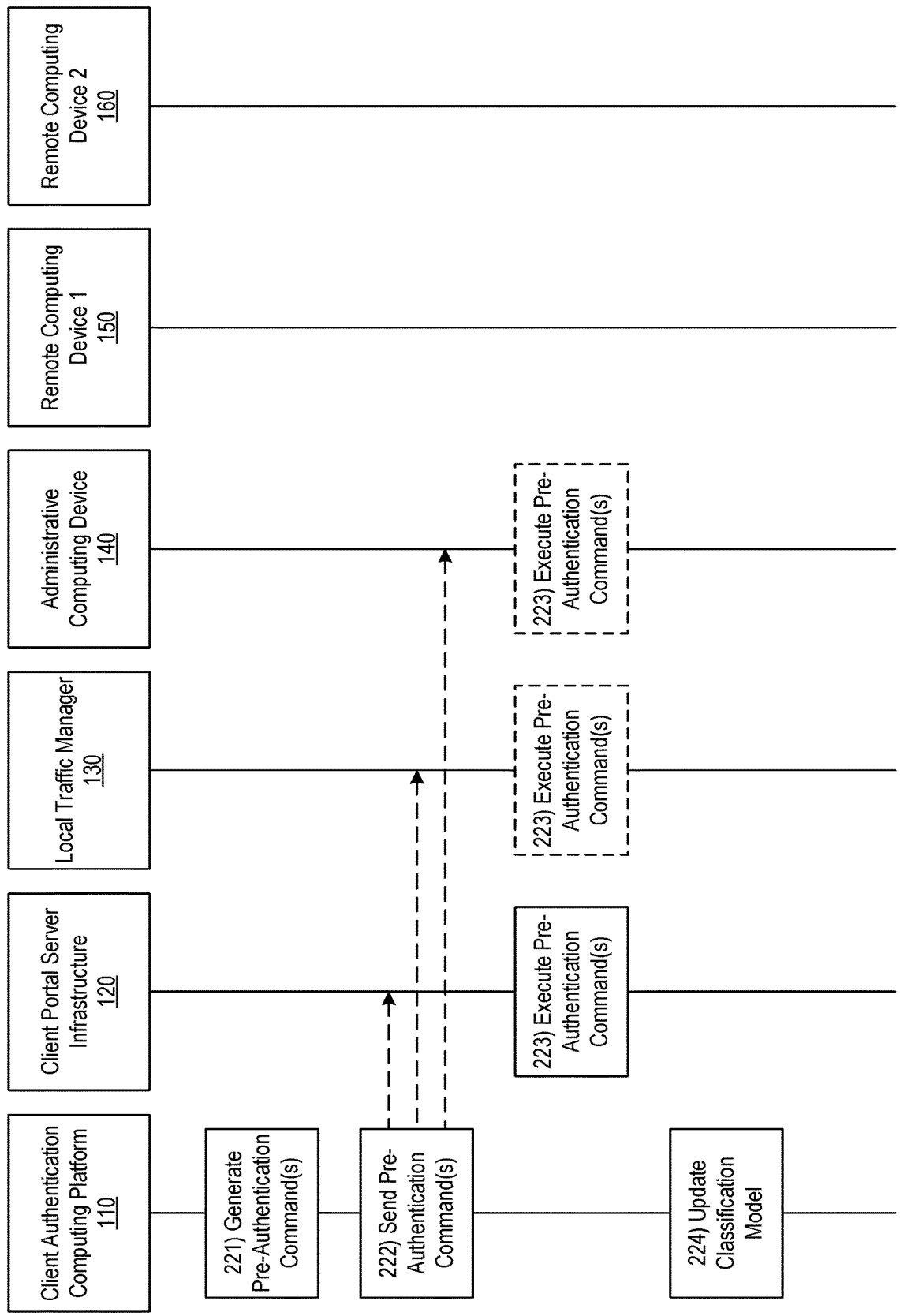

Referring to FIG. 2F, at step 221, client authentication computing platform 110 may generate one or more pre-authentication response commands. For example, at step 221, based on determining that the second enriched access request associated with the second remote computing device (e.g., remote computing device 160) is likely not malicious, client authentication computing platform 110 may generate one or more second pre-authentication response commands directing the client portal server infrastructure (e.g., client portal server infrastructure 120) to process the second enriched access request associated with the second remote computing device (e.g., remote computing device 160) as a legitimate request (which may, e.g., cause client portal server infrastructure 120 to provide remote computing device 160 with access to a client portal and/or other information hosted by client portal server infrastructure 120, as illustrated below). Additionally or alternatively, client authentication computing platform 110 may generate one or more pre-authentication response commands that cause local traffic manager 130 and/or administrative computing device 140 to perform various actions, such as prioritizing communications exchanged with remote computing device 160 and/or presenting one or more notifications.

At step 222, client authentication computing platform 110 may send the one or more pre-authentication response commands to client portal server infrastructure 120 (and/or to local traffic manager 130 and/or administrative computing device 140, depending on what commands were generated at step 221). For example, at step 222, client authentication computing platform 110 may send, via the communication interface (e.g., communication interface 113), to the client portal server infrastructure (e.g., client portal server infrastructure 120), the one or second pre-authentication response commands directing the client portal server infrastructure (e.g., client portal server infrastructure 120) to process the second enriched access request associated with the second remote computing device (e.g., remote computing device 160) as a legitimate request.

At step 223, client portal server infrastructure 120 may execute the one or more second pre-authentication response commands received from client authentication computing platform 110. Additionally or alternatively, local traffic manager 130 and/or administrative computing device 140 may execute such commands, depending on what pre-authentication response commands were generated and/or sent by client authentication computing platform 110. This execution may, for example, cause client authentication computing platform 110 to update user account state information associated with a user account liked to remote computing device 160, may cause client portal server infrastructure 120 to enable and/or provide remote computing device 160 with access to a client portal and/or other user account information, and/or may cause local traffic manager 130 to route communications exchanged with remote computing device 160 to faster and/or higher priority systems and/or communications channels. Additionally or alternatively, this execution may cause local traffic manager 130 to reconfigure communication settings used when exchanging information with remote computing device 160 and/or may cause administrative computing device 140 to present one or more alerts and/or other notifications (e.g., indicating that requests and/or other communications received from remote computing device 160 are likely not malicious).

At step 224, client authentication computing platform 110 may update the classification model. For example, at step 224, after sending the one or more second pre-authentication response commands to the client portal server infrastructure (e.g., client portal server infrastructure 120), client authentication computing platform 110 may update the pre-authentication classification model based on determining that the second enriched access request associated with the second remote computing device (e.g., remote computing device 160) is likely not malicious. For instance, client authentication computing platform 110 may add information associated with the second enriched access request to the classification model and/or other records for use in the future as another data point in identifying likely legitimate requests.

Subsequently, the example event sequence may end, and client authentication computing platform 110 may continue handling other requests received by local traffic manager 130 from the same and/or other remote computing devices in a similar manner as discussed above (e.g., by analyzing HTTP header information and/or other information associated with such requests using a classification model and responding to likely malicious requests as illustrated above) to implement advanced pre-authentication techniques and improve information security and system integrity for a client portal and/or other information maintained by client portal server infrastructure 120 and/or other systems and devices included in computing environment 100.

Figure 3:
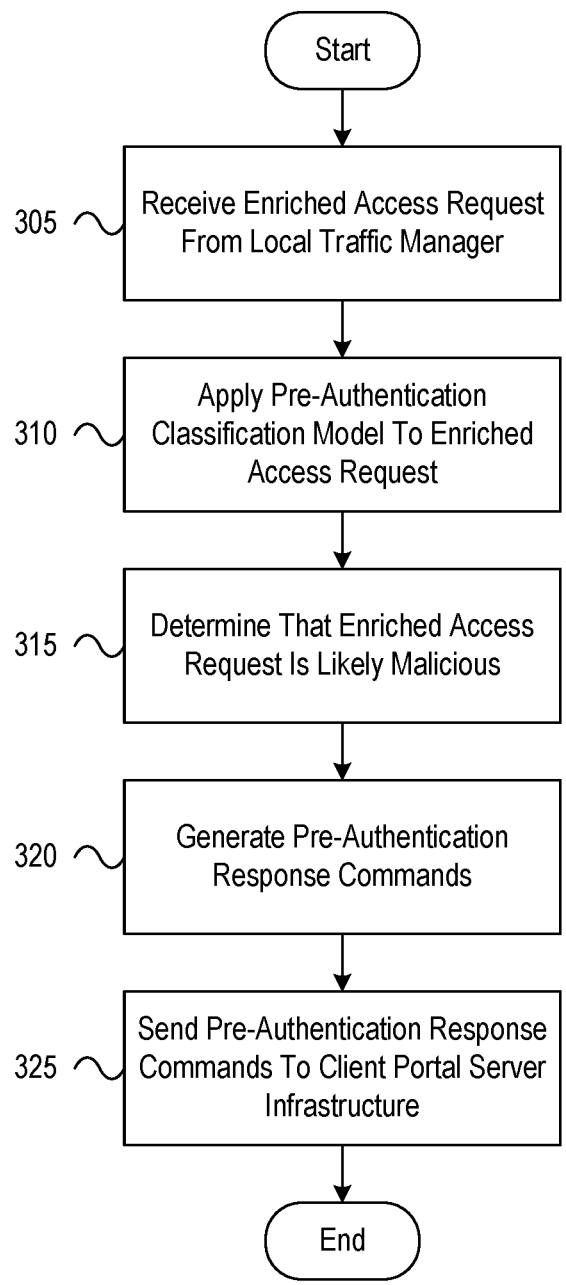
FIG. 3 depicts an illustrative method for preventing unauthorized access to secured information systems using advanced pre-authentication techniques in accordance with one or more example embodiments.

FIG. 3 depicts an illustrative method for preventing unauthorized access to secured information systems using advanced pre-authentication techniques in accordance with one or more example embodiments. Referring to FIG. 3, at step 305, a computing platform having at least one processor, a communication interface, and memory may receive, via the communication interface, from a local traffic manager, a first enriched access request associated with a first remote computing device. At step 310, based on receiving the first enriched access request associated with the first remote computing device from the local traffic manager, the computing platform may apply a pre-authentication classification model to the first enriched access request associated with the first remote computing device. At step 315, based on applying the pre-authentication classification model to the first enriched access request associated with the first remote computing device, the computing platform may determine that the first enriched access request associated with the first remote computing device is likely malicious. At step 320, based on determining that the first enriched access request associated with the first remote computing device is likely malicious, the computing platform may generate one or more first pre-authentication response commands directing client portal server infrastructure to process the first enriched access request associated with the first remote computing device as a malicious request. At step 325, the computing platform may send, via the communication interface, to the client portal server infrastructure, the one or more first pre-authentication response commands directing the client portal server infrastructure to process the first enriched access request associated with the first remote computing device as a malicious request.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      receive, via the communication interface, from a local traffic manager, a first enriched access request associated with a first remote computing device;
      based on receiving the first enriched access request associated with the first remote computing device from the local traffic manager, apply a pre-authentication classification model to the first enriched access request associated with the first remote computing device;
      based on applying the pre-authentication classification model to the first enriched access request associated with the first remote computing device, determine that the first enriched access request associated with the first remote computing device is likely malicious;
      based on determining that the first enriched access request associated with the first remote computing device is likely malicious, generate one or more first pre-authentication response commands directing client portal server infrastructure to process the first enriched access request associated with the first remote computing device as a malicious request; and
      send, via the communication interface, to the client portal server infrastructure, the one or more first pre-authentication response commands directing the client portal server infrastructure to process the first enriched access request associated with the first remote computing device as a malicious request,
      wherein receiving the first enriched access request associated with the first remote computing device from the local traffic manager comprises receiving, from the local traffic manager, one or more hypertext transfer protocol (HTTP) headers originating from a first access request received by the local traffic manager from the first remote computing device and additional enrichment information generated by the local traffic manager based on the first access request received by the local traffic manager from the first remote computing device, and
      wherein applying the pre-authentication classification model to the first enriched access request associated with the first remote computing device comprises:
         using a dependent probability machine learning model to calculate a probability that the first enriched access request associated with the first remote computing device is likely malicious based on the one or more HTTP headers originating from the first access request received by the local traffic manager from the first remote computing device and based on the additional enrichment information generated by the local traffic manager; and
         based on the probability calculated using the dependent probability machine learning model exceeding a predetermined threshold, determining that the first enriched access request associated with the first remote computing device is likely malicious.

2. The computing platform of claim 1, wherein sending the one or more first pre-authentication response commands directing the client portal server infrastructure to process the first enriched access request associated with the first remote computing device as a malicious request causes the client portal server infrastructure to deny access to the first remote computing device.

3. The computing platform of claim 1, wherein sending the one or more first pre-authentication response commands directing the client portal server infrastructure to process the first enriched access request associated with the first remote computing device as a malicious request causes the client portal server infrastructure to connect the first remote computing device to a honeypot site in which actual user account information is not accessible.

4. The computing platform of claim 1, wherein sending the one or more first pre-authentication response commands directing the client portal server infrastructure to process the first enriched access request associated with the first remote computing device as a malicious request causes the client portal server infrastructure to throttle communications associated with the first remote computing device.

5. The computing platform of claim 1, wherein sending the one or more first pre-authentication response commands directing the client portal server infrastructure to process the first enriched access request associated with the first remote computing device as a malicious request causes the client portal server infrastructure to require step-up authentication credentials from the first remote computing device.

6. The computing platform of claim 1, wherein the memory stores additional computer-readable instructions that, when executed by the at least one processor, cause the computing platform to:
prior to receiving the first enriched access request associated with the first remote computing device from the local traffic manager:
receive a known legitimate request reference dataset comprising HTTP header information associated with verified legitimate requests;
receive a known malicious request reference dataset comprising HTTP header information associated with verified malicious requests;
generate the pre-authentication classification model based on the known legitimate request reference dataset and the known malicious request reference dataset; and
store the pre-authentication classification model generated based on the known legitimate request reference dataset and the known malicious request reference dataset.

7. The computing platform of claim 1, wherein the memory stores additional computer-readable instructions that, when executed by the at least one processor, cause the computing platform to:
after sending the one or more first pre-authentication response commands to the client portal server infrastructure, update the pre-authentication classification model based on determining that the first enriched access request associated with the first remote computing device is likely malicious.

8. The computing platform of claim 7, wherein the memory stores additional computer-readable instructions that, when executed by the at least one processor, cause the computing platform to:
receive, via the communication interface, from the local traffic manager, a second enriched access request associated with a second remote computing device;
based on receiving the second enriched access request associated with the second remote computing device from the local traffic manager, apply the pre-authentication classification model to the second enriched access request associated with the second remote computing device;
based on applying the pre-authentication classification model to the second enriched access request associated with the second remote computing device, determine that the second enriched access request associated with the second remote computing device is likely not malicious;
based on determining that the second enriched access request associated with the second remote computing device is likely not malicious, generate one or more second pre-authentication response commands directing the client portal server infrastructure to process the second enriched access request associated with the second remote computing device as a legitimate request; and
send, via the communication interface, to the client portal server infrastructure, the one or more second pre-authentication response commands directing the client portal server infrastructure to process the second enriched access request associated with the second remote computing device as a legitimate request.

9. A method, comprising:
at a computing platform comprising at least one processor, a communication interface, and memory:
receiving, by the at least one processor, via the communication interface, from a local traffic manager, a first enriched access request associated with a first remote computing device;
based on receiving the first enriched access request associated with the first remote computing device from the local traffic manager, applying, by the at least one processor, a pre-authentication classification model to the first enriched access request associated with the first remote computing device;
based on applying the pre-authentication classification model to the first enriched access request associated with the first remote computing device, determining, by the at least one processor, that the first enriched access request associated with the first remote computing device is likely malicious;
based on determining that the first enriched access request associated with the first remote computing device is likely malicious, generating, by the at least one processor, one or more first pre-authentication response commands directing client portal server infrastructure to process the first enriched access request associated with the first remote computing device as a malicious request; and
sending, by the at least one processor, via the communication interface, to the client portal server infrastructure, the one or more first pre-authentication response commands directing the client portal server infrastructure to process the first enriched access request associated with the first remote computing device as a malicious request,
wherein receiving the first enriched access request associated with the first remote computing device from the local traffic manager comprises receiving, from the local traffic manager, one or more hypertext transfer protocol (HTTP) headers originating from a first access request received by the local traffic manager from the first remote computing device and additional enrichment information generated by the local traffic manager based on the first access request received by the local traffic manager from the first remote computing device, and
wherein applying the pre-authentication classification model to the first enriched access request associated with the first remote computing device comprises:
using a dependent probability machine learning model to calculate a probability that the first enriched access request associated with the first remote computing device is likely malicious based on the one or more HTTP headers originating from the first access request received by the local traffic manager from the first remote computing device and based on the additional enrichment information generated by the local traffic manager; and based on the probability calculated using the dependent probability machine learning model exceeding a predetermined threshold, determining that the first enriched access request associated with the first remote computing device is likely malicious.

10. The method of claim 9, wherein sending the one or more first pre-authentication response commands directing the client portal server infrastructure to process the first enriched access request associated with the first remote computing device as a malicious request causes the client portal server infrastructure to deny access to the first remote computing device.

11. The method of claim 9, wherein sending the one or more first pre-authentication response commands directing the client portal server infrastructure to process the first enriched access request associated with the first remote computing device as a malicious request causes the client portal server infrastructure to connect the first remote computing device to a honeypot site in which actual user account information is not accessible.

12. The method of claim 9, wherein sending the one or more first pre-authentication response commands directing the client portal server infrastructure to process the first enriched access request associated with the first remote computing device as a malicious request causes the client portal server infrastructure to throttle communications associated with the first remote computing device.

13. The method of claim 9, wherein sending the one or more first pre-authentication response commands directing the client portal server infrastructure to process the first enriched access request associated with the first remote computing device as a malicious request causes the client portal server infrastructure to require step-up authentication credentials from the first remote computing device.

14. The method of claim 9, comprising:
prior to receiving the first enriched access request associated with the first remote computing device from the local traffic manager:
receiving, by the at least one processor, a known legitimate request reference dataset comprising HTTP header information associated with verified legitimate requests;
receiving, by the at least one processor, a known malicious request reference dataset comprising HTTP header information associated with verified malicious requests;
generating, by the at least one processor, the pre-authentication classification model based on the known legitimate request reference dataset and the known malicious request reference dataset; and
storing, by the at least one processor, the pre-authentication classification model generated based on the known legitimate request reference dataset and the known malicious request reference dataset.

15. The method of claim 9, comprising:
after sending the one or more first pre-authentication response commands to the client portal server infrastructure, updating, by the at least one processor, the pre-authentication classification model based on determining that the first enriched access request associated with the first remote computing device is likely malicious.

16. One or more non-transitory computer-readable media storing instructions that, when executed by a computing platform comprising at least one processor, a communication interface, and memory, cause the computing platform to:
receive, via the communication interface, from a local traffic manager, a first enriched access request associated with a first remote computing device;
based on receiving the first enriched access request associated with the first remote computing device from the local traffic manager, apply a pre-authentication classification model to the first enriched access request associated with the first remote computing device;
based on applying the pre-authentication classification model to the first enriched access request associated with the first remote computing device, determine that the first enriched access request associated with the first remote computing device is likely malicious;
based on determining that the first enriched access request associated with the first remote computing device is likely malicious, generate one or more first pre-authentication response commands directing client portal server infrastructure to process the first enriched access request associated with the first remote computing device as a malicious request; and
send, via the communication interface, to the client portal server infrastructure, the one or more first pre-authentication response commands directing the client portal server infrastructure to process the first enriched access request associated with the first remote computing device as a malicious request,
wherein receiving the first enriched access request associated with the first remote computing device from the local traffic manager comprises receiving, from the local traffic manager, one or more hypertext transfer protocol (HTTP) headers originating from a first access request received by the local traffic manager from the first remote computing device and additional enrichment information generated by the local traffic manager based on the first access request received by the local traffic manager from the first remote computing device, and
wherein applying the pre-authentication classification model to the first enriched access request associated with the first remote computing device comprises:
using a dependent probability machine learning model to calculate a probability that the first enriched access request associated with the first remote computing device is likely malicious based on the one or more HTTP headers originating from the first access request received by the local traffic manager from the first remote computing device and based on the additional enrichment information generated by the local traffic manager; and
based on the probability calculated using the dependent probability machine learning model exceeding a predetermined threshold, determining that the first enriched access request associated with the first remote computing device is likely malicious.

* * * * *